United States Patent [19]

Ege

[11] Patent Number: 4,729,553
[45] Date of Patent: Mar. 8, 1988

[54] GRIPPING GUIDE BAR FOR CARRIER STRIP

[75] Inventor: Sigmund Ege, Oslo, Norway

[73] Assignee: Kloften & Kloften A/S, Oslo, Norway

[21] Appl. No.: 937,814

[22] Filed: Dec. 4, 1986

Related U.S. Application Data

[63] Continuation of Ser. No. 742,008, Jun. 6, 1985, abandoned, which is a continuation-in-part of Ser. No. 601,950, Apr. 19, 1984, Pat. No. 4,563,563.

[51] Int. Cl.⁴ .................................................. B25B 1/06
[52] U.S. Cl. ............................ 269/225; 269/229; 269/254 CS
[58] Field of Search .................... 269/97, 98, 152, 225, 269/229, 231, 235, 254 CS

[56] References Cited

U.S. PATENT DOCUMENTS

| | | | |
|---|---|---|---|
| 449,039 | 3/1891 | Fietsch, Jr. | 269/235 |
| 824,777 | 7/1906 | Brooks | 269/229 |
| 1,318,057 | 10/1919 | Dean | 269/235 |
| 2,471,103 | 5/1949 | Franks et al. | 269/254 |
| 2,568,952 | 9/1951 | Dailey | 269/98 |
| 2,693,160 | 11/1954 | Gauthier | 269/97 |
| 3,530,792 | 9/1970 | Valeila | 269/225 |

Primary Examiner—Frederick R. Schmidt
Assistant Examiner—Judy J. Hartman
Attorney, Agent, or Firm—Victor F. Volk

[57] ABSTRACT

A guide bar for carrier strip grips the strip ribbon between adjustable pins and can accept a wide range of strip dimensions. The pins project from spring-actuated disks that are recessed into the upper surface of a slide bar. Associated gears at the undersurface of the bar cause pairs of the disks to turn in unison.

5 Claims, 6 Drawing Figures

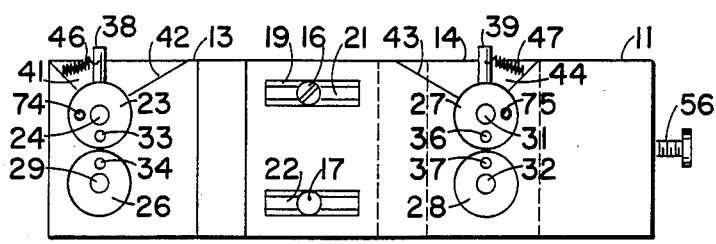
FIG. 1
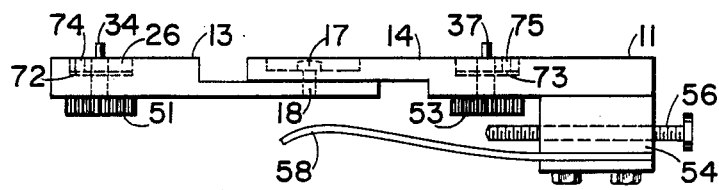
FIG. 2
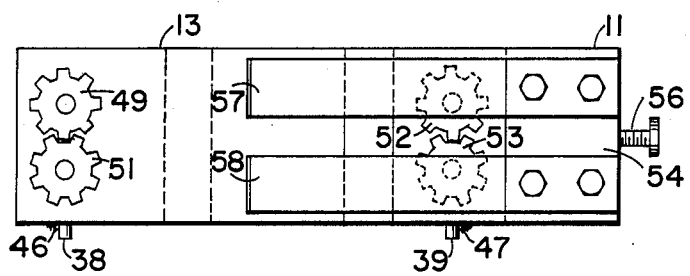
FIG. 3
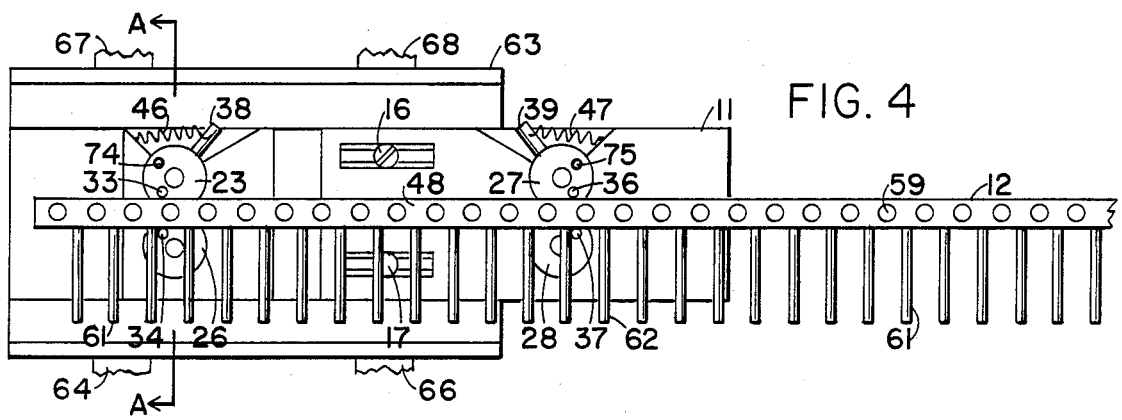
FIG. 4
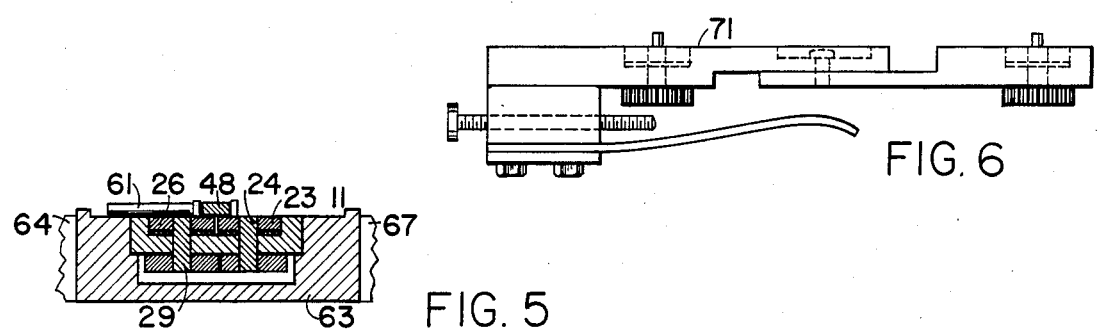
FIG. 5
FIG. 6

GRIPPING GUIDE BAR FOR CARRIER STRIP

This application is a continuation of application Ser. No. 742,008, now abandoned, filed June 6, 1985, which was a continuation-in-part of pending application Ser. No. 601,950, filed Apr. 19, 1984, now U.S. Pat. No. 4,563,563.

BACKGROUND OF THE INVENTION

In the handling of carrier strip, by which I refer to a continuous metallic ribbon that supports a large plurality of integral elements, such as connectors, projecting from at least one edge of the ribbon, it has been usual to have regularly spaced holes punched in the ribbon so that the strip can be paid over sprockets and the like when handled by automatic equipment. In the parent application cited hereinabove there is described a splicing machine for carrier strip, and, in particular, devices for guiding such strip through the processes of end trimming and joining in such a machine. Guide bars described in the aforesaid application rely on the holes in the strip ribbon to orient the strip, and have pins that fit these holes for that purpose. However these guide bars must have pin sizes and spacing that fit these holes for the particular strip they will serve. When a different carrier strip is to be spliced a different set of guide bars is required. For certain conditions of operation, where the same splicing apparatus is called upon to splice a range of different strips within a relatively short working time it becomes desirable to use the same guide bars for all the strips. The present invention for the first time makes this possible.

SUMMARY OF THE INVENTION

I have invented a guide bar device for holding carrier strip which comprises an elongated bar member with an upper flat surface that has two pairs of circular recesses. Two pairs of disks fit slidably into these recesses and gripping means, such as a pin, project upwardly from each of the disks. Individual gear means, positioned on the other side of the bar, are connected by shafts to each of the disks. The gear means of each pair of disks intermesh so that the rotation of one disk causes rotation of the other disk of either pair. The bar member is comprised of extensible elements and includes means for locking these elements in position together. It also comprises a threaded block fixed to its underside and a screw threaded through the block to serve as a stop for the lengthwise movement of the bar.

One of each of the disks includes a lever arm for manual rotation so as to spread apart the gripping means, and the bar may advantageously comprise at least one spring clip for attachment to a jaw or guide plate. Spring means are provided for rotating the disks and urging the gripping means together. My device for holding carrier strip that comprises a flat ribbon having regularly spaced elements projecting therefrom, comprises first and second gripping means comprising pin means disposed against either edge of the ribbon, with one of the pin means of each of the gripping means being disposed against one of the elements, and spring means for urging the pin means against the ribbon edges so as to grip the carrier strip, both longitudinally and laterally.

BRIEF DESCRIPTION OF THE DRAWING

FIG. 1 shows a stop view of the device of my invention.

FIG. 2 shows a side view of the device of FIG. 1.

FIG. 3 shows a view of the underside of the device of FIG. 1.

FIG. 4 shows a top view of the device of FIG. 1 inserted in a grooved guide plate and supporting a length of carrier strip.

FIG. 5 shows a section through the lines A—A of FIG. 4.

FIG. 6 shows a side view of an other handed of the device of FIG. 1.

DETAILED DESCRIPTION OF PREFERRED EMBODIMENT

Referring to FIGS. 1-5, a guide bar 11 is an improvement in the guide bars numbered 61 and 105 in my parent application in that the present device can accomodate a wide range of carrier strips such as a strip 12 (FIG. 4) and also in that it positively grips the strip, without necessarily requiring the clamping action of an upper jaw for this purpose. The bar 11 comprises two interlocking sections 13, 14 held together by flat headed studs 16, 17 the bottoms of which are threaded into the section 13 as at the point 18 for the stud 17. The stud 16 passes through a slot 19 in the section 14 and can be tightened by means of a screw-head slot 21 to lock the sections 13, 14 of the guide bar 11 together. The stud 17 passes through a slot 22 in the section 14 and both of the slot areas are recessed so that the flat heads of the two studs are flush with the upper surface of the bar 11.

A disk 23 on a shaft 24 is recessed into a circular relief in the upper surface of the section 13 so that the upper surface of the disk is flush with the upper surface of the bar 11, as are the upper surfaces of similar disks 26, 27, 28 on respective shafts 29, 31, 32. Gripping pins 33, 34, 36, 37 project upwardly from the respective disks 23, 26, 27, 28 and finger levers 38, 39 extend from the edges of the respective disks 23 and 27. Recesses in the upper surfaces of the bar 11, defined by walls 41, 42 and 43, 44, provide space for movement of the levers 38, 39 and for tension springs 46, 47, attached to these levers, which, as shall be explained, urge the pins 33, 34 and 36, 37 to grip a flat ribbon 48 of the strip 12. Although I have used tension springs to urge the rotation of the disks 23, 27, other spring means such, for example, as flat spiral springs, may be used within the scope of my invention.

Referring particularly to FIGS. 2 and 3 the bottoms of the shafts 24, 29, 31, and 32 terminate respectively in spur gears 49, 51, 52, and 53 of which gear 49 meshes with gear 51 and gear 52 meshes with gear 53, so that the pins 33, 34 are urged together by the spring 46 and the pins 36, 37 are urged together by the spring 47.

A block 54, fastened to the underside of the section 14 is threaded to take a long machine screw 56 and to support spring clips 57, 58. Slide surfaces such as thin nylon interlayers 72 and 73 (FIG. 2) are inserted under the disks 23, 26, 27, 28 to prevent binding, if necessary.

Referring to FIG. 4, the ribbon 48 is punctuated with openings 59-59, which in the above identified parent of this application, were used to secure them, by means of pins thereon, to a guide bar that was required to have a pin size and spacing to match the particular connector strip. Connectors 61-61 are integrally attached to the ribbon 48 and it will be understood that, although my apparatus finds greatest utility for splicing connector strip it can be used for strips where the projecting members do not comprise connectors. The pairs of pins 33, 34, and 36, 37 press against the ribbon 48 due to the springs 46, 47. The pin 34 is also pressed against one of the connectors 61. To firmly control the strip 12 the pin 37 should also fit against a connector 62, and for this purpose, the slotted screw head of the stud 16 is turned to loosen it while the sections 13 and 14 are pulled apart. When the pin 37 is firmly against the connector 62 the stud 16 is tightened to lock the sections of the bar 11 together. To have positive control of the lengthwise movement of the strip the pins must be positioned on the forward side of one connector and the rearward side of another. The bar 11 slides in grooves of a guide plate 63 which may, as in my parent application, take the form of clamping jaws with hinges having stubs 64, 66 and a handle with stubs 67, 68. The spring clips 57, 58 grip a bottom surface 69 of the guide plate 63 but permit the bar 11 to be slid forward or backward on the plate while holding the strip 12. The present device is principally used in splicing apparatus for which we have so far described means for holding a right-hand tape segment 12, the ribbon 48 of which will be spliced to the corresponding ribbon of a left hand tape segment, not shown, to be carried by a guide bar 71 (FIG. 6) having elements in the mirror image of those of the bar 11.

In the practice of my invention the carrier strip 12 to be spliced is laid across the bar 11 and the lever 38 is urged to the right until the pins 33, 34 have spread apart far enough for the ribbon 48 to lie flat against the upper surface of the bar between the two pins. The strip is slid to the right until the pin touches one of the connectors. Thereupon the lever 38 is released so that the pins will grip the ribbon. The lever 39 is then pressed to the right to accept the ribbon 46 between the pins 36, 37. The stud 16 having first been loosened the sections of the guide bar are spread apart until the pin 37 reaches a connector. The lever is released and the stud is then tightened and the same procedure is followed with a matching strip on the bar 71 in a guide plate oppositely placed to the plate 11. A knife blade (not shown) is brought down to trim the left end of the ribbon 48. After a similar routine has been performed with the matching strip and the guide bar 71 the two cut ends of ribbon are brought together with silver solder, not shown, over an electrode, not shown, and the two are soldered together. By means of set screws 74, 75 in threaded holes through respective disks 23, 27 the disks can be locked in position to receive further lengths of connector strip if these strips will have identical dimensions. Whereas my parent application describes a procedure whereby upper jaws are brought down upon the plates holding the guide bars in order to keep the carrier strip firmly in position during trimming and soldering, my present invention holds the ribbon so firmly between the gripping pins that these upper jaws may be eliminated, and the time required for opening and closing them.

The foregoing description has been exemplary rather than definitive of my invention for which I desire an award of Letters Patent as defined in the appended claims.

I claim:

1. A device for holding carrier strip including a ribbon having regularly spaced elements projecting therefrom, said device comprising:
    (A) a guide plate comprising a groove for slidably accommodating an elongated bar member,
    (B) an elongated sliding bar member comprising an upper flat surface supportingly underlying said ribbon and said elements,
    (C) two pairs of circular recesses in said surface,
    (D) two pairs of disks fitting in slidable rotation into said recesses, surfaces of said disks being flush with said upper flat surface,
    (E) gripping means including a pin means projecting upwardly from each of said disks being grippingly disposed against opposite pages of said ribbon, at least one of said pins means being disposed in abutment with one of said spaced elements,
    (F) individual gear means attached to each of said disks, said gear means being positioned on an underside of said bar member, said gear means of each of said pairs of disks intermeshing, whereby rotation of one disk causes rotation of the other disk of either pair, and spring means on said bar for rotating said disks, thereby urging together said gripping means.

2. The device of claim 1 wherein said bar member comprises extensible elements, and comprising means for locking together said elements.

3. The device of claim 1 wherein said bar member comprises a threaded block fixed to an underside thereof and a screw threaded through said block, said screw serving as a stop against lengthwise movement of said bar member.

4. The device of claim 3 comprising at least one spring clip affixed to the underside of said block.

5. The device of claim 1 wherein one disk of each of said pairs comprises a lever arm for rotating said disk.

* * * * *